United States Patent [19]
Misch et al.

[11] 4,185,845
[45] Jan. 29, 1980

[54] LEVEL REGULATOR FOR AUTOMOTIVE VEHICLES

[75] Inventors: Wolfgang Misch, Stuttgart; Hans Kubach, Konntal-Mu, both of Fed. Rep. of Germany

[73] Assignee: Robert Bosch GmbH, Stuttgart, Fed. Rep. of Germany

[21] Appl. No.: 895,767

[22] Filed: Apr. 12, 1978

[30] Foreign Application Priority Data

Apr. 14, 1977 [DE] Fed. Rep. of Germany ....... 2716476

[51] Int. Cl.² .................................. B60G 17/04
[52] U.S. Cl. .............................. 280/6 H; 280/707; 280/DIG. 1
[58] Field of Search ........ 280/6 R, 6 H, 707, DIG. 1; 180/41

[56] References Cited

U.S. PATENT DOCUMENTS

| 3,502,347 | 3/1970 | Busignies | 280/707 |
|---|---|---|---|
| 3,830,138 | 8/1974 | Joneleit | 280/707 X |
| 3,873,123 | 3/1975 | Joneleit | 280/707 |
| 4,105,216 | 8/1978 | Graham et al. | 280/707 X |

FOREIGN PATENT DOCUMENTS

| 2016963 | 10/1971 | Fed. Rep. of Germany . |
|---|---|---|
| 1680301 | 3/1972 | Fed. Rep. of Germany . |
| 2046841 | 9/1972 | Fed. Rep. of Germany . |
| 2124542 | 11/1972 | Fed. Rep. of Germany . |
| 2360149 | 8/1974 | Fed. Rep. of Germany . |

*Primary Examiner*—Joseph F. Peters, Jr.
*Assistant Examiner*—Michael Mar
*Attorney, Agent, or Firm*—Frishauf, Holtz, Goodman & Woodward

[57] ABSTRACT

A digital or analogue regulator circuit for activating a pump or pressure reducing valve, whose action respectively raises and lowers the body of a vehicle relative to the rear axle, each operating with a time delay so that temporary level changes will not initiate a regulatory process. Feedback circuits provide hysteresis. In both embodiments, level changes are represented by changes in the collector potential of a transistor and positive and negative feedback are provided to the base of the transistor to create the hysteresis or dead zone. In the digital embodiment, a counter generates the delay and the negative feedback.

15 Claims, 3 Drawing Figures

LEVEL REGULATOR FOR AUTOMOTIVE VEHICLES

The present invention relates to systems for regulating the level of the body of the vehicle relative to one of its axles. It is a disadvantage of known systems of this type that they react to changes in level of the body of the vehicle which are created by, for example, bumps in the road.

THE INVENTION

It is an object of the present invention to furnish a level regulating system for a motor vehicle which does not respond to temporary unevenness in the road or to level changes due to acceleration and deceleration. Further, it is an object of the invention to furnish a system wherein the regulation is stopped substantially without delay after the vehicle level has been regulated to the desired or reference level. The system is to be relatively inexpensive and simple to maintain.

Briefly, in accordance with the present invention, the pressure in spring elements is increased or reduced for, respectively, raising or lowering the body of the vehicle relative to one of its axles, only after a predetermined delay time following the generation of a signal indicating that the actual level of the body of the vehicle does not correspond to the reference level. Regulation is stopped substantially immediately when the actual level is equal to the reference level.

DRAWING ILLUSTRATING A PREFERRED EMBODIMENT

Figure 1:
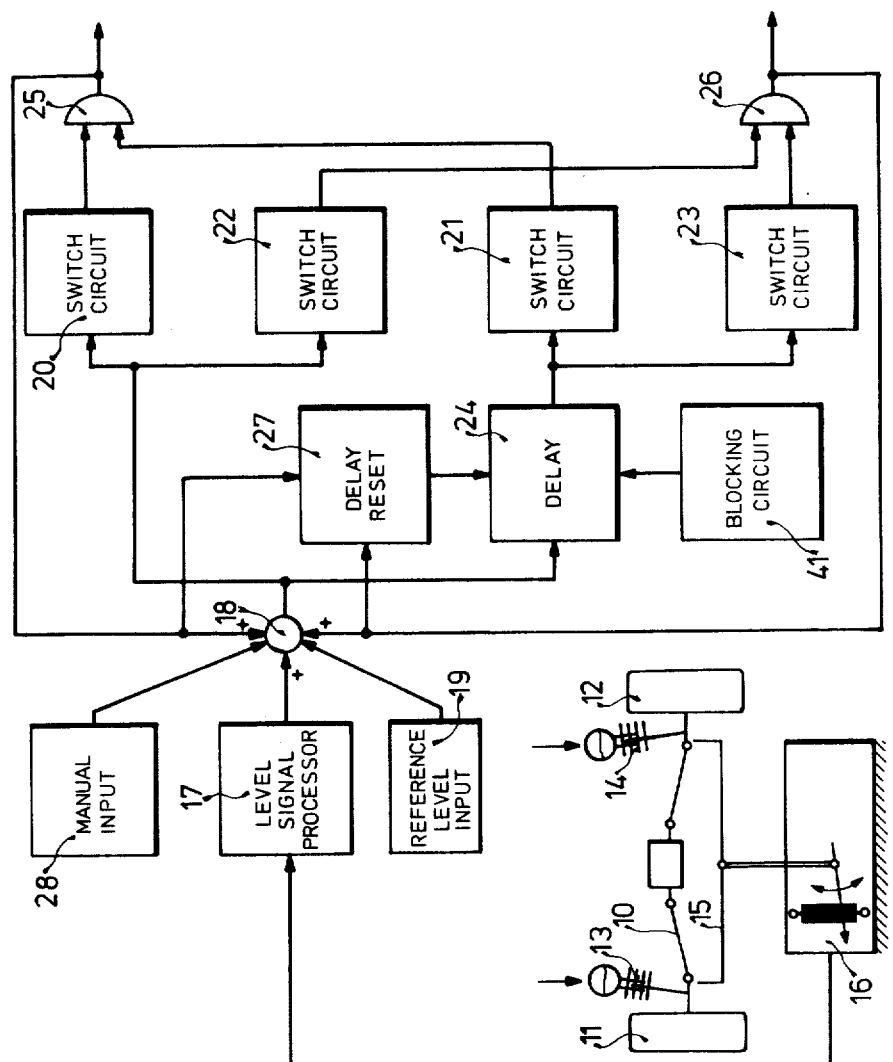
FIG. 1 is a block diagram of the regulatory system of the present invention as connected to the motor vehicle.

FIG. 1 is a block diagram showing a level control system for the rear axle 10 of a motor vehicle. Rear wheels 11 and 12 are fastened to axle 10. Wheels 11 and 12 are braced relative to the body of the vehicle by means of hydropneumatic springs 13 and 14. Hydropneumatic springs 13 and 14 operate to lift and lower the body by, respectively, creating pressure within the hydropneumatic spring by means of a pump, thereby causing the hydropneumatic spring to expand, and decreasing the pressure by means of a pressure reducing valve, thereby causing the hydropneumatic spring to contract. The pump, the pressure reducing valve and the hydropneumatic springs 13 and 14 are herein referred to as means for raising and lowering the body of the vehicle. Mounted between the rear axle stabilizer 15 and the body of the vehicle is an inductive angle sensor 16 which senses the angle through which stabilizer 15 has rotated and therefore the level of the body of the vehicle. Sensor 16 is connected to a level signal processing circuit 17 which feeds a level signal corresponding to the level of the body of the vehicle into a summing point 18. The output signal of processing circuit 17 is herein called the actual level signal. Summing point 18 also receives a reference level signal from a circuit 19. Although the reference level signal is shown as being supplied by a separate block 19 in FIG. 1, the actual reference level can be furnished, for example, by setting the threshold values for switching circuits 20-23 which control the pressure increase and decrease in the hydropneumatic springs 13 and 14. Switching circuits 20 and 22 are connected directly to the summing point 18. This connection signifies that these switches are switched off without delay when the actual level of the body of the vehicle is at the reference level.

Further switching circuits 21 and 23 are activated by the output signal of summing point 18 only after a delay furnished by a delay unit 24. The outputs of switching circuits 20 and 21 are connected to the first and second inputs of an AND gate 25 whose output activates the pump. Similarly, the outputs of switching circuits 22 and 23 are connected to the first and second input of an AND gate 26 whose output energizes the pressure reducing valve. Because of these AND gate connections, activation of either the pump or the pressure reducing valve will not take place until after the delay furnished by delay unit 24, but the shutoff will occur immediately when the output signal of summing point 18 signifies that the body of the vehicle is at reference level.

When the "1" signal at the output of either AND gate 25 or AND gate 26 changes to a "0" signal, a regulating process has terminated. This signal is applied to a reset stage 27 which resets delay unit 24 at the end of each regulating process. For each new regulating process initiated by a signal at the output of summing point 18, the full delay of unit 24 will again be effective.

A manual reference level input stage 28 is furnished to allow the driver to change the reference level of the body of the vehicle in order that the head lights will illuminate the road for an adequate distance. In the simplest case this is a potentiometer.

Figure 2:
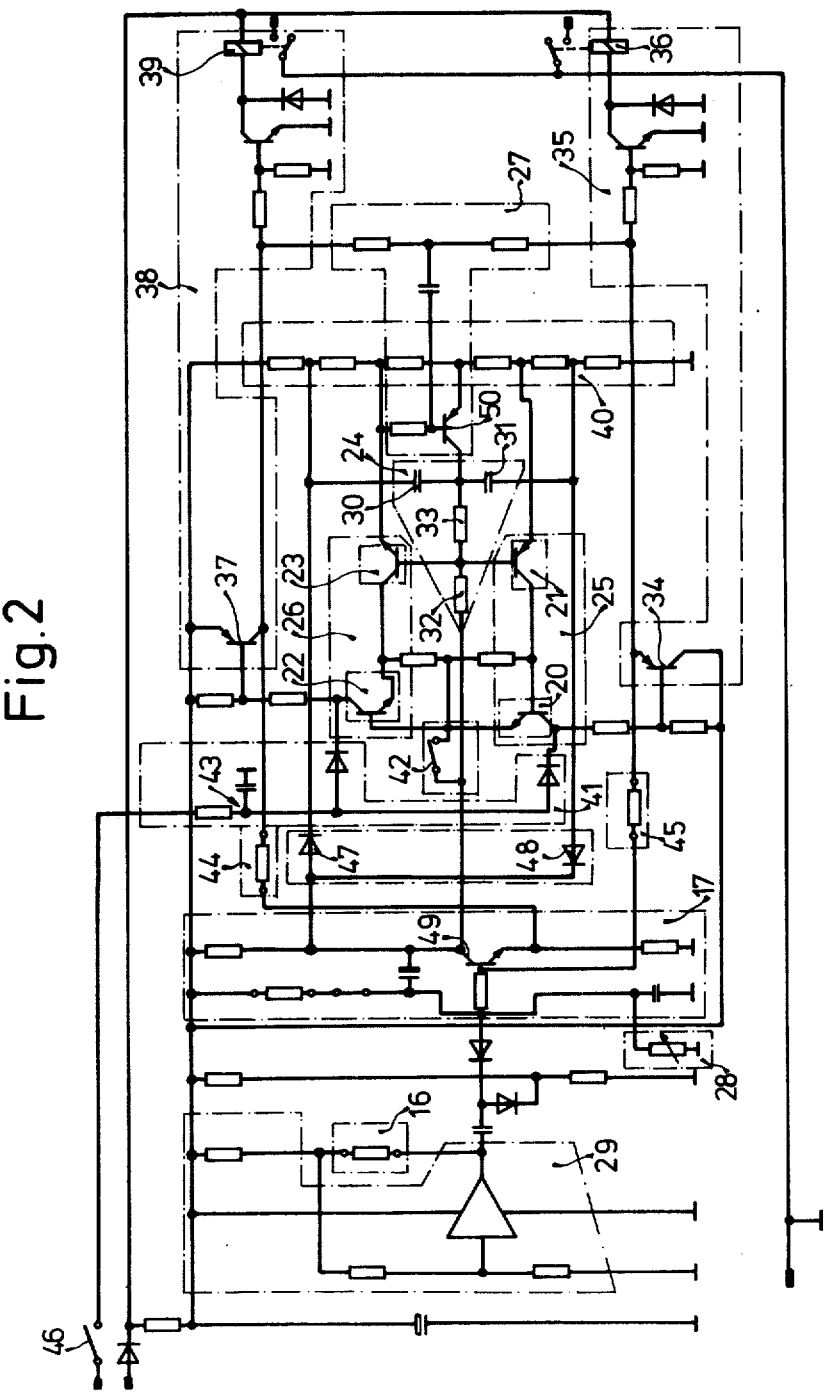
FIG. 2 is a schematic circuit diagram of an analogue regulatory system.

FIG. 2 is the circuit diagram of a level regulator in analogue form. Angle sensor 16, which furnishes the angle signal corresponding to the actual level of the body of the vehicle, cooperates with a relaxation oscillator 29. Relaxation oscillators are well known in the art and will not be described in detail here. The signal at the output of relaxation oscillator 29 is a signal whose frequency is proportional to the level of the vehicle body. The output of relaxation oscillator 29 is connected to level signal processing circuit 17 which changes the frequency of the relaxation oscillator into a current whose amplitude is proportional to this frequency. Stage 17 is connected to delay stage 24 which is an intergrator circuit having capacitors 30 and 31. Capacitors 30 and 31 are connected to resistors 32 and 33. The output of delay circuit 24, that is the common point of resistors 32 and 33, is connected to the gate of transistors 21 and 23. Transistors 21 and 23 are switched from the conductive to the nonconductive and from the nonconductive to the conductive state after a delay determined by the delay circuit 24. The emmiter-collector circuits of transistors 21 and 23 are connected to further transistors 20 and 22. Transistors 22 and 23 together form AND gate 26, while transistors 20 and 21 are connected in such a manner that together they form AND gate 25. The output signal of AND gate 25 is connected to output stage 35 via a switching transistor 34. Output stage 35 activates a relay 36 which causes the pump to activated. Similarly, the output of AND gate 26 is connected through a switching transistor 37 with an output stage 38. Output stage 38 activates a relay 39 which in turn causes the pressure reducing valve to be activated.

The threshold values for transistors 20-23 are derived from a voltage divider 40. The point at which switches 20-23 switch depends upon the resistance values of the resistors constituting the voltage divider. Further, a blocking circuit 41 is connected to transistors 20-23. It is the function of blocking circuit 41 to prevent initiation of a regulating process and to interrupt an already ongoing regulating process for a predetermined acceleration or deceleration of the vehicle. Blocking circuit 41 includes an acceleration switch 42 and is connected through a RC circuit 43 with the brake lights 46 of the vehicle. No regulation will thus take place if the level of the vehicle body changes due to the deceleration during braking.

Positive feedback resistors 44 and 45 are connected, respectively, between output stage 38 and output stage 35 and level signal processing circuit 17. These resistors serve to determine the switching hysteresis between the switching in and the switching out of the pump and pressure reducing valve and thereby the dead zone in which no regulatory process takes place at all. Diodes 47 and 48 limit the operating range of the collector voltage of transistor 49.

The delay stage 24 which includes capacitors 30, 31 and resistors 32, 33 is connected to reset circuit 27. Reset circuit 27 includes a switching transistor 50 which, when conductive, allows discharge of capacitors 30 and 31. The switching transistor 50 is switched to the conductive state at the end of a regulatory process so that capacitors 30 and 31 will be discharged at the start of the new regulatory process, thereby making the full delay available. A potentiometer 28 allows the manual adjustment of the reference level for correction of the distance covered by the head lights.

OPERATION

As mentioned above, the signal at the output of relaxation oscillator 29 is changed into a current whose amplitude corresponds to the frequency of the output signal of the relaxation oscillator. This current is applied to the base of transistor 49, thereby changing the effective emitter-collector resistance of transistor 49. The current for charging capacitors 30 and 31 will vary correspondingly. If the level of the body of the vehicle is too low, a potential will finally appear at the common point of resistors 32 and 33 which switches transistor 21 into the conductive state. If switch 42 (an acceleration switch) is closed, transistor 20 will become conductive when the voltage at the collector of transistor 49 is more negative than the voltage at the emitter of transistor 21. This causes transistor 34 to become conductive also. When transistor 34 becomes conductive, output stage 35 is energized and relay 36 operates to initiate operation of the pump. Pressure is thus build up in springs 13 and 14 and the body of the vehicle is lifted. When the body has reached the reference level, the collector of transistor 49 and therefore the emitter of transistor 20, is more positive than the collector transistor 21 and transistor 20 blocks. This blocking of transistor 20 takes place regardless of the conductive state of transistor 21 and is aided by the action of resistor 45. Blocking of transistor 20 interrupts the regulatory process immediately. The switching out of output stage 35 causes transistor 50 to be switched to the conductive state. Capacitors 30 and 31 discharge over the emitter-collector circuit of transistor 50 and the resistors of voltage divider 40.

The system operates in the same manner when a decrease in the level of the body of the vehicle is required. It is important to remember output stages 35 and 38 are only energized following a delay, but that denergization occurs immediately after the reference level is reached, since transistors 20 and 22 block immediately. Since transistors 22 and 20 are connected to the collector of transistor 49 through the acceleration switch 42, neither of these transistors can become conductive when the acceleration switch is open as is the case for example when the vehicle rounds a curve or when the brake light switch is closed. As was previously mentioned, no regulation is supposed to take place under these conditions.

Figure 3:
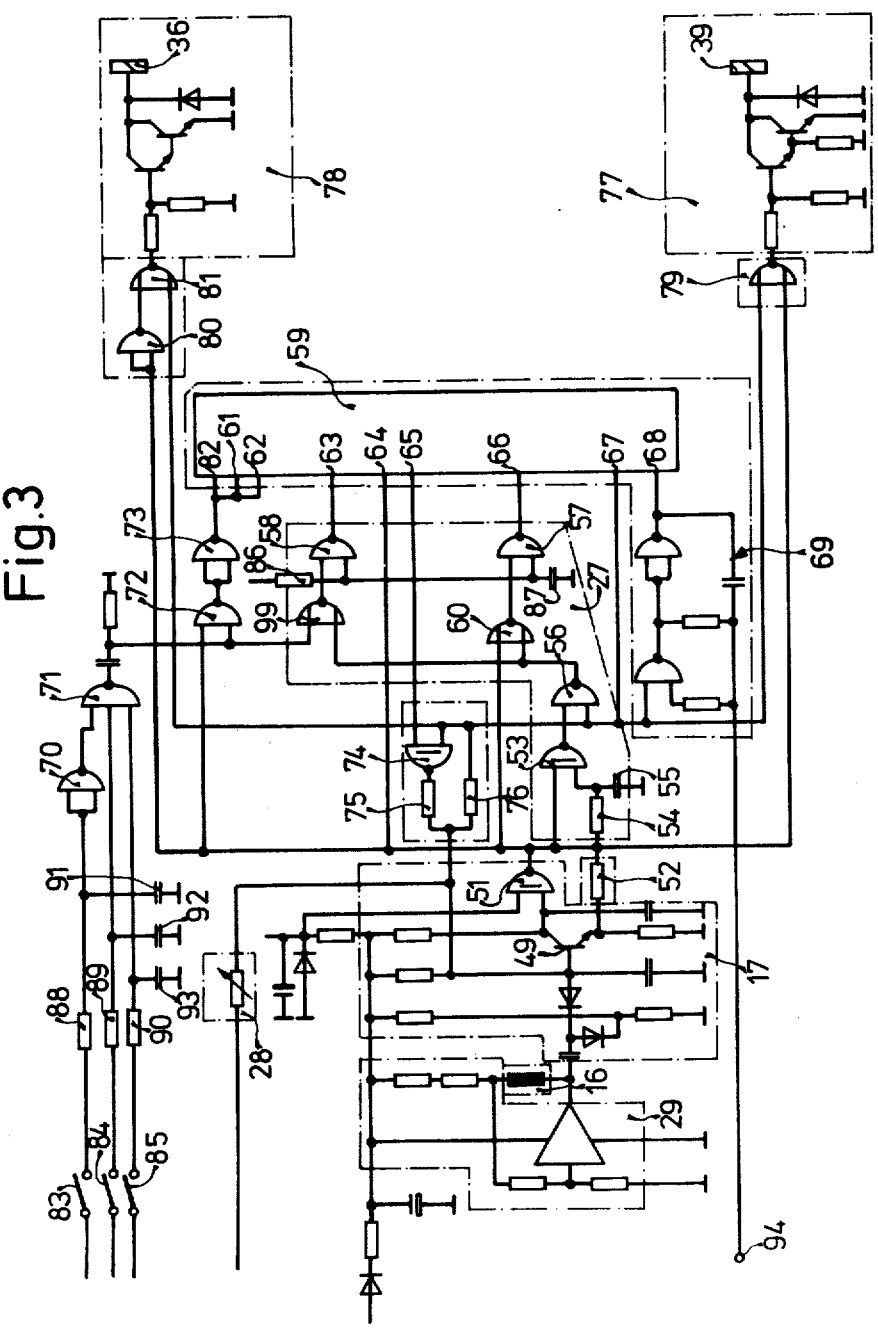
FIG. 3 is a schematic diagram of a digital regulatory system.

FIG. 3 shows a digital embodiment of a level regulator in accordance with the present invention. Elements 16, 29 and 17 are identical to those shown in FIG. 2. Relaxation oscillator 29 is connected to the inductive angle sensor 16 and furnishes a signal whose frequency changes with the actual level of the body of the vehicle. The current at the output of transistor 49 of the level signal processing circuit 17 is, again, a current whose amplitude varies as a function of the level of the body of the vehicle. However, in FIG. 3, the collector of transistor 49 is connected to one input of an exclusive NOR gate 51. A positive feedback resistor has one terminal connected to the emitter of transistor 49 and the other terminal connected through an RC circuit including a resistor 54 and a capacitor 55 to the first input of an exclusive NOR gate 53. The output of exclusive NOR gate 53 is connected to an input of a NAND gate 56 which is a part of reset circuit 27. Reset circuit 27 further includes a NAND gate 57, a NAND gate 58 and NOR gates 99 and 60. An up/down counter 59 has set inputs 82, 61, and 62, a preset enable input 63, an up-/down input 64, an output 65, a set input 66, a carry output 67, and a clock input 68. Such counters are commercially available under reference numeral CD 4029 AD. A clock generator 69 is connected to input 68 of counter 59. NAND gates 70, 71, 72 and 73 allow set inputs 82, 62 to be energized by different contacts of the motor vehicle. For example, a door contact 83 furnishes a "0" signal when closed, while a trunk contact 84 and a ignition 85 each furnish a "1" signal when closed. These signals cause changes in the count on counter 59. Counter output 65 is connected to one input of an exclusive NOR gate 74, whose output is connected through a resistor 75 to the base of transistor 49. A resistor 76 is connected from the second input of exclusive NOR gate 74 to the base of transistor 49. Output stages 77 and 78 correspond to stages 35 and 38 of FIG. 2. Output stage 77 is energized through a NOR gate 79, while output stage 78 is energized through a NAND gate 80 and a NOR gate 81.

Counter 59 is a four stage binary up/down counter. Insofar as it serves as delay unit 24 of FIG. 1, the pulse repetition rate of clock pulse generator 69 determines the actual delay.

OPERATION

When the equipment is first switched on, counter 59 is set to the number "8". The direction in which counting is to take place is determined by the signal applied at input 64. The signal at input 64 is the same as that at the output of exclusive NOR gate 51. The latter is "0" or "1" depending upon the direction in which the actual level differs from the reference level. If the level of the body of the vehicle is too low, "1" signal is furnished, if too high a "0" signal. If there were no hysteresis in the system, each of these signals would start the count of counter 59 in the corresponding direction until the carry signal appears at output 67. At this time, either stage 77 or stage 78, depending upon the signal at the output of exclusive NOR gate 51, would be energized.

Since such continually alternating operation between the pump and pressure reducing valve is undesirable, the system is designed to count between counts 7 and 8 when the actual level of the body of the vehicle is within a defined dead zone about the reference level. This dead zone results from positive feedback applied to transistor 49 through resistor 52 and negative feedback applied to the base of transistor 49 through exclusive NOR gate 75 and the associated resistors 75 and 76. This will be described in greater detail below.

If the difference between the actual level of the body of the vehicle and the reference level exceeds the difference covered by the dead zone and the body is to be raised, counter 59 starts to count upwards. If the defense exceeds the dead zone in a direction requiring a lowering of the body, counter 59 counts toward zero. Only when the count on the counter reaches either the number 15 or the number 0 is the carry signal furnished at output 67. The time required for the count on the counter to change from "8" to either "15" or "0" is thus the delay time. The signal at the output of counter terminal 67 stops clock generator 69. Further, if the output of exclusive NOR gate 51 as a "1" signal, NOR gate 81 will furnish a signal for energizing the pump, while, if the signal at the output of exclusive NOR gate 51 as a "0" signal, NOR gate 79 will furnish a signal which energizes the pressure reducing valve.

The undelayed termination of the regulatory process takes place when the actual level of the body of the vehicle is the same as the reference level. At this point the counter is set to "8" and the clock generator is restarted. The effect of counter 59 and the positive feedback furnished by resistor 52 in determining the dead zone and the delays for switching in the regulatory process will be discussed below. It will be noted here that a regulatory process without delay can be achieved before the vehicle is in motion by closing either door switch 53, trunk switch 84 or ignition switch 85. The counter is set from its then-present value to either "0" or "15" immediately starting the regulatory process. Clock generator 69 is also stopped.

If the foot brake or the hand brake is activated or if predetermined accelerations are exceeded either in the direction which the vehicle is travelling or perpendicular thereto, clock generator 69 is stopped and the regulatory process inhibited. The accelerations are sensed by means of acceleration switches.

Manual adjustment of the reference level of the vehicle is possible as it was in the analog embodiment, by means of a potentiometer 28.

The operation of the circuit of FIG. 3 will now be described in greater detail. When ignition switch 25 is closed, voltage is applied across an RC circuit including resistor 86 and capacitor 87. Until this voltage reaches the threshold value of NAND gates 57 and 58, each of these NAND gates carries a "1" output. The two "1" outputs set counter 59 to the number "8".

If the effect of the positive and negative feedback circuits on transistor 49 is at first neglected, the output of exclusive NOR gate 51 would be a "1" signal if the body of the vehicle were at a level less than the reference level, and a "0" signal if the vehicle body were at a level exceeding the reference level. Since the output signal of gate 51 is applied directly to input 64 of counter 59, this counter would count upwards when the level of the vehicle is too low and downwards when the level of the vehicle is too high. The clock pulses furnished by clock pulse generator 69 to clock input 68 of counter 59 would then be counted until either the count of "15" or the count of "0" is reached. At this point a carry signal would be generated at output 67 of counter 59, that is the signal at this output would go from a "1" to a "0" signal. At this time, if the output of gate 51 is a "1" signal, NOR gate 81 will furnish a "1" output energizing output circuit 78, relay 36 and therefore the pump whose action causes a raising of the level of the body of the vehicle. If, on the contrary, the output of gate 51 is "0" signal, NOR gate 79 will furnish a "1" output signal which activates output stage 77, relay 39 and the pressure reducing valve. The body of the vehicle will thus be raised or lowered alternately as the signal at the output of gate 51 changes. This type of operation with the frequent switching of the various control members, and in particular of the pump, is undesirable. It is the function of the feedback circuits to provide a dead zone within which no such regulation takes place.

The effect of the feedback circuits is as follows: when the actual level of the carriage is too low, the collector voltage of transistors 49 is more positive. Gate 51 furnishes a "1" signal. This "1" signal is directly applied to input 64 of counter 59 and causes the counter to count in the up direction. But the next pulse from clock pulse generator 69 causes a change of the signal level at output 65 of counter 59 from a "0" signal to a "1" signal, changing the output of exclusive NOR gate 74. This increases the current in the base-emitter circuit of transistor 49 by an amount corresponding to the value of resistor 75. The voltage at the collector of transistor 49 becomes more negative. Positive feedback through resistor 52 becomes effective and the output of gate 51 changes to a "0" signal.

The "0" signal at terminal 64 causes the counter to count in a down direction. For the next pulse received by counter 59 at input 68, the output signal at terminal 65 changes from a "1" signal to a "0" signal as does the signal at the output of gate 74. Base current for transistor 49 is reduced, the collector voltage rises until the positive feedback takes effect and gate 51 furnishes a "1" signal. This oscillation between the count of "7" and "8" on counter 59 continues, without activation of either the pump or the pressure reducing valve, as long as the difference between the actual level of the body of the vehicle and the reference level does not exceed the width of the dead zone, that is the change in base current which can be compensated for by the current supplied through resistor 75.

When the difference between the reference level and the actual level of the body of the vehicle exceeds the dead zone values, counter 59 continues to count in the up or down direction depending upon the signal at the output of gate 51 until the carry signal generated at output 67 of counter 59 initiates the actual regulatory process through gates 80, 81 or 79 as described above. When the level of the vehicle has reached the reference level the output signal of gate 51 changes, thereby changing the output of gate 81 or or gate 79 from a "1" signal to a "0" signal. This immediately terminates the regulatory process.

At the end of the regulatory process, the delay must be automatically reset. In FIG. 3 this reset is carried out as follows: both inputs of exclusive NOR gate 53 are connected to the output of gate 51, but the second input is connected to the output of gate 51 through an RC circuit including resistor 54 and capacitor 55. When the output of gate 51 changes, the signals at the inputs of gate 53 will differ for a time interval corresponding to the time constant of RC circuit 54, 55. For this time, the output of exclusive NOR gate 53 will be a "0" signal. Since, then, both inputs of NAND gate 56 receive a "0" signal, its output will be a "1" signal. With a "1" signal at one of its inputs, NOR gate 60 will furnish a "0" signal. A "1" signal will thus be applied to input 66 of counter 59 through NAND gate 57. Further, at this time, the output of NOR gate 99 is a "0" signal and that of NAND gate 58 "1" signal. As previously mentioned, a "1" signal applied to terminal 63 and 66 of counter 59 cause the number "8" to be set. Setting to "8" constitutes a resetting of the counter to its initial conditions. The setting of the counter to "8" also causes the output at terminal 57 to switch from a "0" signal to a "1" signal, thereby activating clock generator 69. The system is thus ready for the next regulatory process.

Prior to a trip, the level of the body of the vehicle may be raised by closing either door switch 83, trunk switch 84 or ignition switch 85. Each of these switches is followed by an RC circuit, 88, 91; 89, 92; 90, 93. When any of these switches are closed, the output of NAND gate 71 changes from a "0" signal to a "1" signal. If the vehicle level is too low, gate 51 furnishes a "1" output signal. The output of NAND gate 72 is thus a "0", that of NAND gate 73 a "1", causing a "1" signal to be applied to set inputs 82, 61 and 62 of counter 59. The output of exclusive NOR gate 53 is a "1" signal, the output of NAND gate 56 a "0" signal, the output of NOR gate 60 a "0" signal and the output of NAND gate 57 a "1" signal which is applied to input 66 of counter 59. The output of NOR gate 99 is a "0" signal, causing a "1" signal to be furnished at the output of NAND gate 58. This signal is applied to input 63 of counter 59. A "1" signal applied to set inputs, 63, 66, 82, 61 and 62 of counter 59 causes the counter to be set to count "15". The output at terminal 67 of counter 59 changes from a "1" to a "0". NAND gate 80 furnishes a "0" signal, causing NOR gate 81 to furnish a "1" signal which energizes relay 36 and thereby the pump.

If the acceleration of the vehicle either in the direction of travel or in a direction perpendicular thereto exceeds a predetermined acceleration or deceleration, no regulatory process is to take place. For this purpose a terminal 94 is provided. Terminal 94 is connected to acceleration switches in such a manner that, for excess accelerations, the signal applied thereto changes from a "0" to a "1" signal causing clock generator 69 to be stopped. This prevents initiation of level regulation.

The use of a feedback from the counter for determining the dead zone and the use of the same counter for determining the delay results in a particularly simple embodiment. Since the delay time is the time required for the count on the counter to change from the originally set number to a predetermined carry, the repetition rate of clock generator 69 can be made quite low even for large delay times. The resetting to the original count by means of a dynamic exclusive NOR gate with associated timing circuit also minimizes the required equipment. It is a particular advantage of the digital solution that it is readily incorporated into an integrated circuit.

Various changes and modifications may be made within the scope of the inventive concept.

We claim:

1. In a motor vehicle having an axle (10) and a vehicle body, level controllable spring means intercoupled between said body and said axle for raising and lowering said body with respect to said axle upon, respectively, pressure increase and pressure decrease in said spring means, level regulator means cooperating with said spring means for increasing and reducing the pressure therein in response to a first and second activating signal, respectively, means (16, 17) continuously furnishing an actual level signal indicative of the actual level of said body of said vehicle;

a regulating system comprising error signal furnishing means (49, 51; 49, 40) continuously furnishing an error signal indicative of the magnitude and direction of said actual level of said body of said motor vehicle relative to a reference level;

delay means (24) connected to said error signal furnishing means, for furnishing a delayed error signal with a predetermined delay time interval following receipt of said error signal;

and activating signal furnishing means (20, 23, 25, 26) for furnishing said first and second activating signal in response to a delayed error signal indicative of a required raising and lowering of said body of said vehicle, respectively, and for terminating the furnishing of said activating signals substantially immediately upon receipt of a zero error signal indicative of an actual level equal to said reference level, said activating signal furnishing means comprising switch means (20, 22) for furnishing said activating signal when in a first state and blocking said activating signal when in a second state respectively, and connecting means for interconnecting said switch means between said error signal furnishing means and said delay means in such a manner that said switch means is switched from said second to said first state only in response to said delayed error signal and from said first to said second state when said error signal is indicative of zero error.

2. Apparatus as set forth in claim 1, wherein said error signal furnishing means includes an amplifier element (49) having an output electrode for furnishing said error signal.

3. Apparatus as set forth in claim 1, wherein said switch means comprises first switch means (20) for furnishing said first activating signal and second switch means (22) for furnishing said second activating signal.

4. Apparatus as set forth in claim 1, wherein said connecting means comprises acceleration switch means (42) for switching said switch means to said second stable state when the acceleration of said vehicle exceeds a predetermined acceleration.

5. Apparatus as set forth in claim 1, further comprising positive feedback means (45) interconnected between said level regulator means and said error signal furnishing means, for creating a switching hysteresis for the furnishing of said first and second activating signals.

6. Apparatus as set forth in claim 4, wherein said vehicle further has brake lights and a brake light switch for energizing said brake lights when closed;

further comprising blocking circuit means interconnected between said brake light switch and said switch means, for maintaining said switch means in said second stable state when said brake light switch is closed.

7. Apparatus as set forth in claim 1, wherein said delay means comprises integrator means.

8. Apparatus as set forth in claim 7, wherein said integrator means comprises clock pulse generator means for furnishing a sequence of clock pulses when energized, and counting means (59) connected to said clock pulse generator means for counting said clock pulses and furnishing said delay error signal when a predetermined count on said counting means is reached.

9. Apparatus as set forth in claim 8, further comprising first logic circuit means (51) connected to said error signal furnishing means, for furnishing a direction signal indicative of the sign of said error signal;

and wherein said counting means comprises an up/down counter having an up/down control input (64) connected to said first logic circuit means in such a manner that the direction of count of said counter is controlled by said direction signal.

10. Apparatus as set forth in claim 9, further comprising means for presetting said counting means to a first preset number, said counting means counting up or down from said first preset number in correspondence to said direction signal;

and wherein said counting means furnishes said delayed error signal when the count on said counting means reaches a first predetermined number when counting in the up direction or a second predetermined number when counting in the down direction.

11. Apparatus as set forth in claim 10, further comprising feedback circuit means (74–76) interconnected between said counting means and said error signal furnishing means, for furnishing a negative feedback signal having an amplitude adapted to change the sign of said error signal if the magnitude of said error signal is less than a predetermined magnitude when the count on said counter is a predetermined feedback count, said predetermined feedback count preceding said first and second predetermined numbers, whereby said counting means is blocked from furnishing said delayed error signal when the magnitude of said error signal is less than a predetermined magnitude.

12. Apparatus as set forth in claim 11, wherein said preset means comprises means for presetting said counting means to a first preset number approximately half way between said first and second predetermined numbers;

and wherein said preset means comprises second logic circuit means (51) for setting said counting means to said first preset number in response to a change of sign of said direction signal.

13. Apparatus as set forth in claim 12, wherein said second logic circuit means comprises an exclusive NOR gate having a first input directly connected to said first logic circuit means and having a second input, and differentiating circuit means for connecting said second input to said first logic circuit means.

14. Apparatus as set forth in claim 9, wherein said activating signal furnishing means comprises first and second activating logic circuit means (79; 80, 81) responsive to said direction signal and said delayed error signal.

15. Apparatus as set forth in claim 10, further comprising positive feedback means (52) connected between the output of said first logic circuit means and said error signal furnishing means.

* * * * *